United States Patent
Sethi

(10) Patent No.: US 8,266,437 B2
(45) Date of Patent: Sep. 11, 2012

(54) ELECTRONIC VOUCHERS AND A SYSTEM AND METHOD FOR ISSUING THE SAME

(75) Inventor: Vincent Sethi, Chandlers Ford (GB)

(73) Assignee: JPMorgan Chase Bank, N.A., New York, NY (US)

(*) Notice: Subject to any disclaimer, the term of this patent is extended or adjusted under 35 U.S.C. 154(b) by 2120 days.

(21) Appl. No.: 10/183,747

(22) Filed: Jun. 25, 2002

(65) Prior Publication Data

US 2003/0014363 A1   Jan. 16, 2003

Related U.S. Application Data

(60) Provisional application No. 60/300,632, filed on Jun. 25, 2001.

(51) Int. Cl.
  H04L 9/32 (2006.01)
  G06F 7/04 (2006.01)
  G06F 15/16 (2006.01)

(52) U.S. Cl. .................. 713/176; 726/8; 726/9; 726/20; 283/17; 283/904

(58) Field of Classification Search .................. 902/1, 4; 705/14; 713/175–176
  See application file for complete search history.

(56) References Cited

U.S. PATENT DOCUMENTS

| | | |
|---|---|---|
| 3,938,091 A | 2/1976 | Atalla et al. |
| 4,321,672 A | 3/1982 | Braun et al. |
| 4,567,359 A | 1/1986 | Lockwood |
| 4,633,397 A | 12/1986 | Macco |
| 4,695,880 A | 9/1987 | Johnson et al. |
| 4,696,491 A | 9/1987 | Stenger |
| 4,713,761 A | 12/1987 | Sharpe et al. |
| 4,725,719 A | 2/1988 | Oncken et al. |
| 4,745,468 A | 5/1988 | Von Kohorn |
| 4,799,156 A | 1/1989 | Shavit |
| 4,823,264 A | 4/1989 | Deming |
| 4,882,675 A | 11/1989 | Nichtberger et al. |
| 4,926,255 A | 5/1990 | Von Kohorn |
| 4,964,043 A | 10/1990 | Galvin |
| 4,992,940 A | 2/1991 | Dworkin |
| 5,016,270 A | 5/1991 | Katz |

(Continued)

FOREIGN PATENT DOCUMENTS

EP   1 014 318   6/2000

(Continued)

OTHER PUBLICATIONS

Sandy Shaw, JISC Technology Applications programme (JTAP)-Overview of Watermarks, Fingerprints, and Digital Signatures, Aug. 3, 1999, pp. 1-20.*

(Continued)

*Primary Examiner* — Nathan Flynn
*Assistant Examiner* — Trang Doan
(74) *Attorney, Agent, or Firm* — Hunton & Williams LLP

(57) ABSTRACT

A system and method for issuing electronic vouchers representing value. An issuing server generates an eVoucher that a recipient may use to purchase goods and services from a merchant's e-commerce Web site. The eVoucher includes an image, such as a corporate logo, that identifies the issuing merchant. Nonimage data, such as a unique identifier for the eVoucher and encrypted arbitrary text, is embedded in the eVoucher image and is used to track the use of the eVoucher and to verify its authenticity.

25 Claims, 4 Drawing Sheets

U.S. PATENT DOCUMENTS

| | | | |
|---|---|---|---|
| 5,050,207 | A | 9/1991 | Hitchcock |
| 5,084,816 | A | 1/1992 | Boese et al. |
| 5,157,717 | A | 10/1992 | Hitchcock |
| 5,220,501 | A | 6/1993 | Lawlor et al. |
| 5,233,654 | A | 8/1993 | Harvey |
| 5,265,033 | A | 11/1993 | Vajk et al. |
| 5,317,683 | A | 5/1994 | Hager et al. |
| 5,321,841 | A | 6/1994 | East et al. |
| 5,351,186 | A | 9/1994 | Bullock et al. |
| 5,412,708 | A | 5/1995 | Katz |
| 5,420,405 | A | 5/1995 | Chasek |
| 5,424,938 | A | 6/1995 | Wagner et al. |
| 5,446,740 | A | 8/1995 | Yien et al. |
| 5,450,134 | A | 9/1995 | Legate |
| 5,450,537 | A | 9/1995 | Hirai et al. |
| 5,467,269 | A | 11/1995 | Flaten |
| 5,473,143 | A | 12/1995 | Vak et al. |
| 5,473,732 | A | 12/1995 | Chang |
| 5,485,370 | A | 1/1996 | Naylor et al. |
| 5,511,117 | A | 4/1996 | Zazzera |
| 5,532,920 | A | 7/1996 | Hartrick et al. |
| 5,534,855 | A | 7/1996 | Gajnak et al. |
| 5,537,314 | A | 7/1996 | Kanter |
| 5,537,473 | A | 7/1996 | Saward |
| 5,544,086 | A | 8/1996 | Davis et al. |
| 5,557,334 | A | 9/1996 | Legate |
| 5,557,518 | A | 9/1996 | Rosen |
| 5,568,489 | A | 10/1996 | Yien et al. |
| 5,570,465 | A | 10/1996 | Tsakanikas |
| 5,590,197 | A | 12/1996 | Chen et al. |
| 5,592,560 | A | 1/1997 | Deaton et al. |
| 5,594,837 | A | 1/1997 | Noyes |
| 5,598,557 | A | 1/1997 | Doner et al. |
| 5,606,496 | A | 2/1997 | D'Agostino |
| 5,621,789 | A | 4/1997 | McCalmont et al. |
| 5,621,812 | A | 4/1997 | Deaton et al. |
| 5,625,767 | A | 4/1997 | Bartell et al. |
| 5,634,101 | A | 5/1997 | Blau |
| 5,638,457 | A | 6/1997 | Deaton et al. |
| 5,644,493 | A | 7/1997 | Motai et al. |
| 5,652,786 | A | 7/1997 | Rogers |
| 5,653,914 | A | 8/1997 | Holmes et al. |
| 5,657,383 | A | 8/1997 | Gerber et al. |
| 5,659,165 | A | 8/1997 | Jennings et al. |
| 5,664,115 | A | 9/1997 | Fraser |
| 5,675,637 | A | 10/1997 | Szlam et al. |
| 5,675,662 | A | 10/1997 | Deaton et al. |
| 5,678,046 | A | 10/1997 | Cahill et al. |
| 5,684,870 | A | 11/1997 | Maloney et al. |
| 5,699,528 | A | 12/1997 | Hogan |
| 5,703,344 | A | 12/1997 | Bezy |
| 5,710,886 | A | 1/1998 | Christensen |
| 5,710,887 | A | 1/1998 | Chelliah et al. |
| 5,710,889 | A | 1/1998 | Clark et al. |
| 5,715,298 | A | 2/1998 | Rogers |
| 5,727,163 | A | 3/1998 | Bezos |
| 5,734,838 | A | 3/1998 | Robinson et al. |
| 5,740,231 | A | 4/1998 | Cohn et al. |
| 5,754,840 | A | 5/1998 | Rivette et al. |
| 5,758,328 | A | 5/1998 | Giovannoli |
| 5,761,647 | A | 6/1998 | Boushy |
| 5,761,661 | A | 6/1998 | Coussens et al. |
| 5,765,141 | A | 6/1998 | Spector |
| 5,774,122 | A | 6/1998 | Kojima et al. |
| 5,778,178 | A | 7/1998 | Arunachalam |
| 5,784,562 | A | 7/1998 | Diener |
| 5,787,403 | A | 7/1998 | Randle |
| 5,790,650 | A | 8/1998 | Dunn et al. |
| 5,790,785 | A | 8/1998 | Klug et al. |
| 5,793,861 | A | 8/1998 | Haigh |
| 5,794,221 | A | 8/1998 | Egendorf |
| 5,794,259 | A | 8/1998 | Kikinis |
| 5,796,395 | A | 8/1998 | de Hond |
| 5,802,498 | A | 9/1998 | Comesanas |
| 5,802,502 | A | 9/1998 | Gell et al. |
| 5,815,657 | A | 9/1998 | Williams et al. |
| 5,815,683 | A | 9/1998 | Vogler |
| 5,819,092 | A | 10/1998 | Ferguson et al. |
| 5,819,285 | A | 10/1998 | Damico et al. |
| 5,825,870 | A | 10/1998 | Miloslavsky |
| 5,826,241 | A | 10/1998 | Stein et al. |
| 5,826,245 | A | 10/1998 | Sandberg-Diment |
| 5,826,250 | A | 10/1998 | Trefler |
| 5,828,734 | A | 10/1998 | Katz |
| 5,832,460 | A | 11/1998 | Bednar |
| 5,832,476 | A | 11/1998 | Tada et al. |
| 5,835,580 | A | 11/1998 | Fraser |
| 5,838,906 | A | 11/1998 | Doyle et al. |
| 5,842,178 | A | 11/1998 | Giovannoli |
| 5,842,211 | A | 11/1998 | Horadan et al. |
| 5,844,553 | A | 12/1998 | Hao et al. |
| 5,845,259 | A | 12/1998 | West et al. |
| 5,845,260 | A | 12/1998 | Nakano et al. |
| 5,847,709 | A | 12/1998 | Card et al. |
| 5,848,427 | A | 12/1998 | Hyodo |
| 5,859,920 | A | 1/1999 | Daly et al. |
| 5,862,223 | A | 1/1999 | Walker et al. |
| 5,864,830 | A | 1/1999 | Armetta |
| 5,870,456 | A | 2/1999 | Rogers |
| 5,870,718 | A | 2/1999 | Spector |
| 5,870,724 | A | 2/1999 | Lawlor et al. |
| 5,873,072 | A | 2/1999 | Kight et al. |
| 5,875,249 | A * | 2/1999 | Mintzer et al. ................... 380/54 |
| 5,880,769 | A | 3/1999 | Nemirofsky |
| 5,884,032 | A | 3/1999 | Bateman et al. |
| 5,884,288 | A | 3/1999 | Chang et al. |
| 5,889,863 | A | 3/1999 | Weber |
| 5,892,900 | A | 4/1999 | Ginter et al. |
| 5,896,137 | A * | 4/1999 | Ito et al. ......................... 345/619 |
| 5,898,780 | A | 4/1999 | Liu et al. |
| 5,899,982 | A | 5/1999 | Randle |
| 5,903,881 | A | 5/1999 | Schrader et al. |
| 5,914,472 | A | 6/1999 | Foldare et al. |
| 5,915,244 | A | 6/1999 | Jack et al. |
| 5,918,214 | A | 6/1999 | Perkowski |
| 5,918,217 | A | 6/1999 | Maggioncalda et al. |
| 5,918,239 | A | 6/1999 | Allen et al. |
| 5,920,847 | A | 7/1999 | Kolling |
| 5,926,812 | A | 7/1999 | Hilsenrath et al. |
| 5,933,816 | A | 8/1999 | Zeanah et al. |
| 5,933,817 | A | 8/1999 | Hucal |
| 5,933,823 | A | 8/1999 | Cullen et al. |
| 5,933,827 | A | 8/1999 | Cole et al. |
| 5,940,812 | A | 8/1999 | Tengel et al. |
| 5,943,656 | A | 8/1999 | Crooks |
| 5,950,173 | A | 9/1999 | Perkowski |
| 5,952,641 | A | 9/1999 | Korshun |
| 5,953,710 | A | 9/1999 | Fleming |
| 5,958,007 | A | 9/1999 | Lee et al. |
| 5,960,411 | A | 9/1999 | Hartman et al. |
| 5,963,635 | A | 10/1999 | Szlam et al. |
| 5,963,925 | A | 10/1999 | Kolling et al. |
| 5,963,952 | A | 10/1999 | Smith |
| 5,963,953 | A | 10/1999 | Cram et al. |
| 5,969,318 | A | 10/1999 | Mackenthun |
| 5,970,140 | A | 10/1999 | Sandford, II et al. |
| 5,970,478 | A | 10/1999 | Walker et al. |
| 5,970,482 | A | 10/1999 | Pham et al. |
| 5,982,370 | A | 11/1999 | Kamper |
| 5,987,434 | A | 11/1999 | Libman |
| 5,991,751 | A | 11/1999 | Rivette et al. |
| 5,991,780 | A | 11/1999 | Rivette et al. |
| 5,995,948 | A | 11/1999 | Whitford et al. |
| 5,999,907 | A | 12/1999 | Donner |
| 6,005,936 | A | 12/1999 | Shimizu et al. |
| 6,005,939 | A | 12/1999 | Fortenberry et al. |
| 6,006,249 | A | 12/1999 | Leong |
| 6,012,088 | A | 1/2000 | Li et al. |
| 6,014,636 | A | 1/2000 | Reeder |
| 6,014,638 | A | 1/2000 | Burge et al. |
| 6,016,810 | A | 1/2000 | Ravenscroft |
| 6,018,714 | A | 1/2000 | Risen, Jr. et al. |
| 6,018,724 | A | 1/2000 | Arent |
| 6,026,429 | A | 2/2000 | Jones et al. |
| 6,032,147 | A | 2/2000 | Williams et al. |
| 6,047,269 | A | 4/2000 | Biffar |
| 6,049,835 | A | 4/2000 | Gagnon |

| | | | |
|---|---|---|---|
| 6,055,321 A | 4/2000 | Numao et al. | |
| 6,055,637 A | 4/2000 | Hudson et al. | |
| 6,058,381 A | 5/2000 | Nelson | |
| 6,061,665 A | 5/2000 | Bahreman | |
| 6,064,987 A | 5/2000 | Walker et al. | |
| 6,070,147 A | 5/2000 | Harms | |
| 6,070,244 A | 5/2000 | Orchier et al. | |
| 6,076,072 A | 6/2000 | Libman | |
| 6,081,810 A | 6/2000 | Rosenzweig et al. | |
| 6,088,683 A | 7/2000 | Jalili | |
| 6,088,700 A | 7/2000 | Larsen et al. | |
| 6,098,070 A | 8/2000 | Maxwell | |
| 6,112,181 A | 8/2000 | Shear et al. | |
| 6,116,402 A * | 9/2000 | Beach et al. | 194/216 |
| 6,122,403 A * | 9/2000 | Rhoads | 382/233 |
| 6,131,810 A | 10/2000 | Weiss et al. | |
| 6,134,549 A | 10/2000 | Regnier et al. | |
| 6,141,441 A | 10/2000 | Cass et al. | |
| 6,144,948 A | 11/2000 | Walker et al. | |
| 6,148,293 A | 11/2000 | King | |
| 6,170,011 B1 | 1/2001 | Macleod Beck et al. | |
| 6,185,242 B1 | 2/2001 | Arthur et al. | |
| 6,189,029 B1 | 2/2001 | Fuerst | |
| 6,192,138 B1 | 2/2001 | Yamadaji | |
| 6,195,644 B1 | 2/2001 | Bowie | |
| 6,201,948 B1 | 3/2001 | Cook et al. | |
| 6,202,005 B1 | 3/2001 | Mahaffey | |
| 6,202,054 B1 | 3/2001 | Lawlor et al. | |
| 6,205,435 B1 | 3/2001 | Biffar | |
| 6,208,735 B1 | 3/2001 | Cox et al. | |
| 6,222,932 B1 | 4/2001 | Rao et al. | |
| 6,226,054 B1 * | 5/2001 | Morgan et al. | 348/759 |
| 6,243,481 B1 | 6/2001 | Tao | |
| 6,246,777 B1 | 6/2001 | Agarwal et al. | |
| 6,249,870 B1 | 6/2001 | Kobayashi et al. | |
| 6,252,971 B1 | 6/2001 | Wang | |
| 6,256,736 B1 * | 7/2001 | Coppersmith et al. | 713/176 |
| 6,263,086 B1 | 7/2001 | Wang | |
| 6,275,599 B1 | 8/2001 | Adler et al. | |
| 6,278,791 B1 | 8/2001 | Honsinger et al. | |
| 6,298,356 B1 | 10/2001 | Jawahar et al. | |
| 6,349,242 B2 | 2/2002 | Mahaffey | |
| 6,385,591 B1 * | 5/2002 | Mankoff | 705/14.26 |
| 6,438,594 B1 | 8/2002 | Bowman-Amuah | |
| 6,493,677 B1 | 12/2002 | von Rosen et al. | |
| 6,493,685 B1 | 12/2002 | Ensel et al. | |
| 6,505,773 B1 * | 1/2003 | Palmer et al. | 235/380 |
| 6,535,855 B1 | 3/2003 | Cahill et al. | |
| 6,536,663 B1 | 3/2003 | Lozier et al. | |
| 6,557,039 B1 | 4/2003 | Leong et al. | |
| 6,574,348 B1 * | 6/2003 | Venkatesan et al. | 382/100 |
| 6,609,113 B1 | 8/2003 | O'Leary et al. | |
| 6,609,125 B1 | 8/2003 | Layne et al. | |
| 6,618,579 B1 | 9/2003 | Smith et al. | |
| 6,623,415 B2 | 9/2003 | Gates et al. | |
| 6,807,285 B1 * | 10/2004 | Iwamura | 382/100 |
| 6,807,528 B1 * | 10/2004 | Truman et al. | 704/270 |
| 6,912,315 B1 * | 6/2005 | Wong et al. | 382/232 |
| 6,912,653 B2 * | 6/2005 | Gohl | 713/155 |
| 6,978,378 B1 * | 12/2005 | Koretz | 713/193 |
| 7,013,286 B1 * | 3/2006 | Aggarwal et al. | 705/14.26 |
| 7,065,212 B1 * | 6/2006 | Yu et al. | 380/205 |
| 7,128,272 B2 | 10/2006 | Doublet | |
| 7,151,832 B1 * | 12/2006 | Fetkovich et al. | 380/210 |
| 2001/0012974 A1 | 8/2001 | Mahaffey | |
| 2001/0054003 A1 | 12/2001 | Chien et al. | |
| 2001/0055391 A1 * | 12/2001 | Jacobs | 380/241 |
| 2002/0010599 A1 | 1/2002 | Levison | |
| 2002/0010627 A1 * | 1/2002 | Lerat | 705/14 |
| 2002/0059141 A1 | 5/2002 | Davies et al. | |
| 2002/0077978 A1 | 6/2002 | O'Leary et al. | |
| 2002/0128903 A1 * | 9/2002 | Kernahan | 705/14 |
| 2003/0084647 A1 | 5/2003 | Smith et al. | |
| 2003/0088552 A1 | 5/2003 | Bennett et al. | |
| 2003/0115160 A1 | 6/2003 | Nowlin et al. | |
| 2003/0119642 A1 | 6/2003 | Gates et al. | |
| 2003/0177067 A1 | 9/2003 | Cowell et al. | |
| 2003/0217005 A1 | 11/2003 | Drummond et al. | |
| 2004/0146159 A1 * | 7/2004 | Rosen | 380/200 |

FOREIGN PATENT DOCUMENTS

| | | | |
|---|---|---|---|
| EP | 1014318 | * | 6/2000 |
| EP | 1 056 043 | | 11/2000 |
| JP | 2000-182086 | | 6/2000 |
| JP | 2000-341632 | | 12/2000 |

OTHER PUBLICATIONS

Japan Patent Abstract, JP 2001 331747, Best Reserve: KK, Nov. 30, 2001.

Ko Fujimura et al. "A World Wide Supermarket Scheme Using Rights Trading System," Parallel and Distributed Systems: Workshops, Seventh International Conference on 2000 Iwate, Japan Jul. 4-7, 2000, Los Alamitos, CA USA, IEEE Comput. Soc, US, pp. 289-294.

Jakobsson M. et al. "Secure and Lightweight Advertising on the Web," Computer Networks, Elsevier Science Publishers B. V., Amsterdam, NL, vol. 31, No. 11-16, May 17, 1999, pp. 1101-1109.

Fujimura et al., "XML Voucher: Generic Voucher Language," Internet Draft <URL:HTTP://XML.COVERPAGES.ORG/DRAFT-IETF-TRADE-VOUCHER-LANGE-00.TXT> Retrieved Jan. 27, 2005.

International Search Report Date Sep. 20, 2004.

The check is in the email., Information Today, vol. 12, No. 3, Mar. 1, 1995, ISSN: 8755-6286, 4 pages.

The Gale Group, G&D America's Multi-application Smart Card Selected for Combined Payroll and 'Virtual Banking' Program in Mexico, wysiwyg://0/http://www.dialogclassic.com/history, Business Wire, Apr. 24, 1998, p. 4241047, 3 pages.

Richard Mitchell, Netlink Goes After an Unbanked Niche, wysiwyg://0/http://www.dialogclassic.com/history, ISSN: 1093-1279, Sep. 1999, 4 pages.

eCharge, eCharge Corporation, www.echarge.com, Dec. 3, 1999, 12 pages.

Tracy Pletz et al., Summary of the at your risk architecture, Jun. 3, 1999, 8 pages.

Siebel, Siebel: Ensuring Customer Success, www.siebel.com, Nov. 17, 1999, 29 pages.

OMG, Welcome to OMG's CORBA for Beginners Page!, www.omg.com, May 25, 1999, 4 pages.

Sun MicroSystems, Inc., Schema for Representing CORBA Objects in an LDAP directory, May 21, 1999, 9 pages.

OMG, Library, www.omg.com, May 25, 1999, 5 pages.

OMG, What is CORBA?, , www.omg.com, May 25, 1999, 2 pages.

Overview of CORBA, www.omg.com, May 25, 1999, 4 pages.

JAVA, JAVA™ Technology in the Real World, java.sun.com, May 21, 1999, 7 pages.

JAVA, JAVA™ Servlet API, java.sun.com, May 21, 1999, 5 pages.

JAVA, Staying in Touch with JNDI, java.sun.com, May 21, 1999, 8 pages.

JAVA, JAVA™ Remote Method Invocation (RMI) Interface, java.sun.com, May 21, 1999, 16 pages.

JAVA, Banking on JAVA™ Technology, java.sun.com, May 21, 1999, 7 pages.

JAVA, The JDBC™ Data Access API, java.sun.com, May 21, 1999, 3 pages.

Anne Thomas, Enterprise JAVABEANS™ Technology: Server Component Model for the Java™ platform, java.sun.com, May 21, 1999, 30 pages.

S. R. Hiremath, Numerical Credit Scoring Model, Operations Research Bulletin, WA13.16, Apr. 30, 1975, 2 pages.

Reuters, Getting Smart with Java: Sun Micro Says American Express to Use Java for Smart Card, www.abcnew.go.com/sciences/tech, Jun. 6, 2000, 2 pages.

David Bank, Cash, Check, Charge—What's Next?, Seattle Times, Mar. 6, 1998, 4 pages.

Gerry Vandenengel, Cards on the Internet: Advertising on a $3 Bill, Industry Intelligence, Feb. 1, 1995, 3 pages.

Kim A. Strassel, Dutch Software Concern Experiments with Electronic 'Cash' in Cyberspace, Wall Street Journal, Apr. 17, 1995, 1 page.

Jeffrey Kutler, Cash Card Creator Looking Beyond Mondex, Feb. 9, 1995, 1 page.

David Post, E-Cash: Can't Live With It, Can't Live Without It, The American Lawyer, pp. 116-117, Mar. 1, 1996.
Russell Mitchell, Cyberspace: Crafting software that will let you build a business out there, Business Week, pp. 78-86, Feb. 27, 1995.
Jeffrey Kutler, A Different Drummer on the Data Highway, American Banker, May 12, 1995, No. 91, vol. 160, p. 14 (total 4 pages).
Stephen Eppmt, A Player Goes After Big Bucks in Cyberspace, American Banker, May 5, 1995, vol. 160, No. 86, p. 17 (total 4 pages).
Robert Bamham, Network Brings Together Producers and Companies, Bests Review Feb. 1, 1994, 1 page.
Vanessa Houlder, OFT Gives the Individual Top Priority: Report Calls for Deregulation of Business Lending, The Financial Times, Jun. 8, 1994, 1 page.
Kennedy Maiz, Fannie Mae on the Web, Newsbyte, May 8, 1995, 1 page.
Anne Knowles, Improved Internet Security Enabling On-Line Commerce, PC Week, Mar. 20, 1995, 4 pages.
Aversion Therapy: Banks Overcoming Fear of the Net to Develop Safe Internet-based Payment System w/ Netscape Communicator, Network World, Dec. 12, 1994, 1 page.
Don Clark, Microsoft, Visa to Jointly Develop PC Electronic-Shopping Software, Wall Street Journal, The, B9, Nov. 9, 1994, 3 pages.
Understanding Product Data Management, Hewlett-Packard Company, Apr. 26, 1999, 9 pages.
Getting Started: Specific GE TPN Post Service Use Guidelines, GE, Apr. 26, 1999, 18 pages.
Resource Center: Consolidated Edison Selects GE TPN Post, GE, Apr. 26, 1999, 9 pages.
ThomasNet, Thomas Publishing Company, Apr. 26, 1999, 9 pages.
SoluSource: For Engineers by Engineers, Thomas Publishing Company, Apr. 26, 1999, 10 pages.
Harris InfoSource, Apr. 26, 1999, 12 pages.
Welcome to MUSE, MUSE Technologies, Apr. 26, 1999, 28 pages.
Product Data Integration Technologies, Inc., PDIT, Apr. 26, 1999, 19 pages.
SBA: Pro-Net, SBA, Apr. 1, 1999, 11 pages.
FreeMarkets, FreeMarkets Online, Inc., Apr. 26, 1999, 35 pages.
Associates National Bank (DE) Credit Card Services, The Associates, www.theassocitheassociates.atescomcom/consumer/credit_cards/main.html, Apr. 6, 1999, 6 pages.
At Your Request, Wingspanbankcom, Sep. 28, 1999, 1 page.
Robyn Meredith, Internet bank moves closer to virtual reality, USA Today, May 5, 1995, 1 page.
Marvin Sirbu and J.D. Tygar, NetBill: An Internet Commerce System Optimized for Network Delivered Services, http://www.ini.cmu.edu:80/netbill, pp. 1-12, Feb. 27, 1995, 12 pages.

* cited by examiner

ELECTRONIC VOUCHERS AND A SYSTEM AND METHOD FOR ISSUING THE SAME

CROSS REFERENCE TO RELATED APPLICATIONS

This application claims priority to Provisional Application No. 60/300,632 filed on Jun. 25, 2001, the entirety of which is incorporated by reference.

FIELD OF THE INVENTION

This invention relates generally to electronic vouchers, and more specifically to electronic voucher images containing hidden data embedded in an image file, and a system and method for issuing such electronic vouchers.

BACKGROUND OF THE INVENTION

Vouchers, such as a discount coupons or gift certificates, are negotiable certificates, issued by a merchant, that represent credit against future purchases of the issuing merchant's goods or services. Paper-form and debit card vouchers have been well-known in the art for some time, and are commonly used forms of payment in face-to-face retail transactions. However, the increasing popularity among consumers of purchasing goods and services electronically over the Internet has created a need in the art for electronic vouchers that may be used in e-commerce transactions.

Although proprietary electronic voucher systems currently exist, such systems are very expensive to develop and maintain, and place the issuance of electronic vouchers beyond the reach of most small businesses. Moreover, existing electronic vouchers consist of nothing more than a simple number or keyword that a consumer is prompted to enter during an e-commerce transaction. A number or keyword cannot match the marketing and advertising power of a paper voucher or certificate, which typically displays a corporate logo or other imagery that identifies the issuing merchant. Finally, some known voucher systems force consumers to install proprietary software modules on their computers in order to operate, which may dissuade some consumers from utilizing the electronic vouchers.

Thus, there exists a need in the art for an electronic voucher system that may be implemented using software that is currently available to the consumer, that contains memorable imagery identifying the issuing merchant, and that may easily be implemented without incurring the expense of proprietary code development and maintenance.

SUMMARY OF THE INVENTION

In accordance with an exemplary embodiment of the present invention, a system and method is provided for issuing electronic vouchers representing value. An issuing server generates an eVoucher that a recipient may use to purchase goods and services from a merchant's e-commerce Web site. The eVoucher includes an image, which may be a corporate logo, or any memorable image, that identifies the issuing merchant. Nonimage data is embedded in the eVoucher image and is used to track the recipient's use of the eVoucher, and to verify its authenticity. In accordance with an exemplary embodiment of the present invention, the embedded nonimage data may include a serial number that uniquely identifies the eVoucher. The issuing server uses the serial number to track the value remaining in the eVoucher after each use, and to ensure that the eVoucher is not reused once its value is exhausted. The embedded nonimage data may also include arbitrary text known only to the user. Using public key encryption technology, the arbitrary text is encrypted using the issuing server's public key and embedded in the image. The issuing server stores a copy of the encrypted arbitrary text, and uses it to verify the authenticity of the electronic voucher image when the recipient submits the eVoucher to be redeemed by the merchant.

BRIEF DESCRIPTION OF THE DRAWINGS

For the purposes of illustrating the present invention, there is shown in the drawings a form which is presently preferred, it being understood however, that the invention is not limited to the precise form shown by the drawing in which.

DETAILED DESCRIPTION OF THE INVENTION

Figure 1:
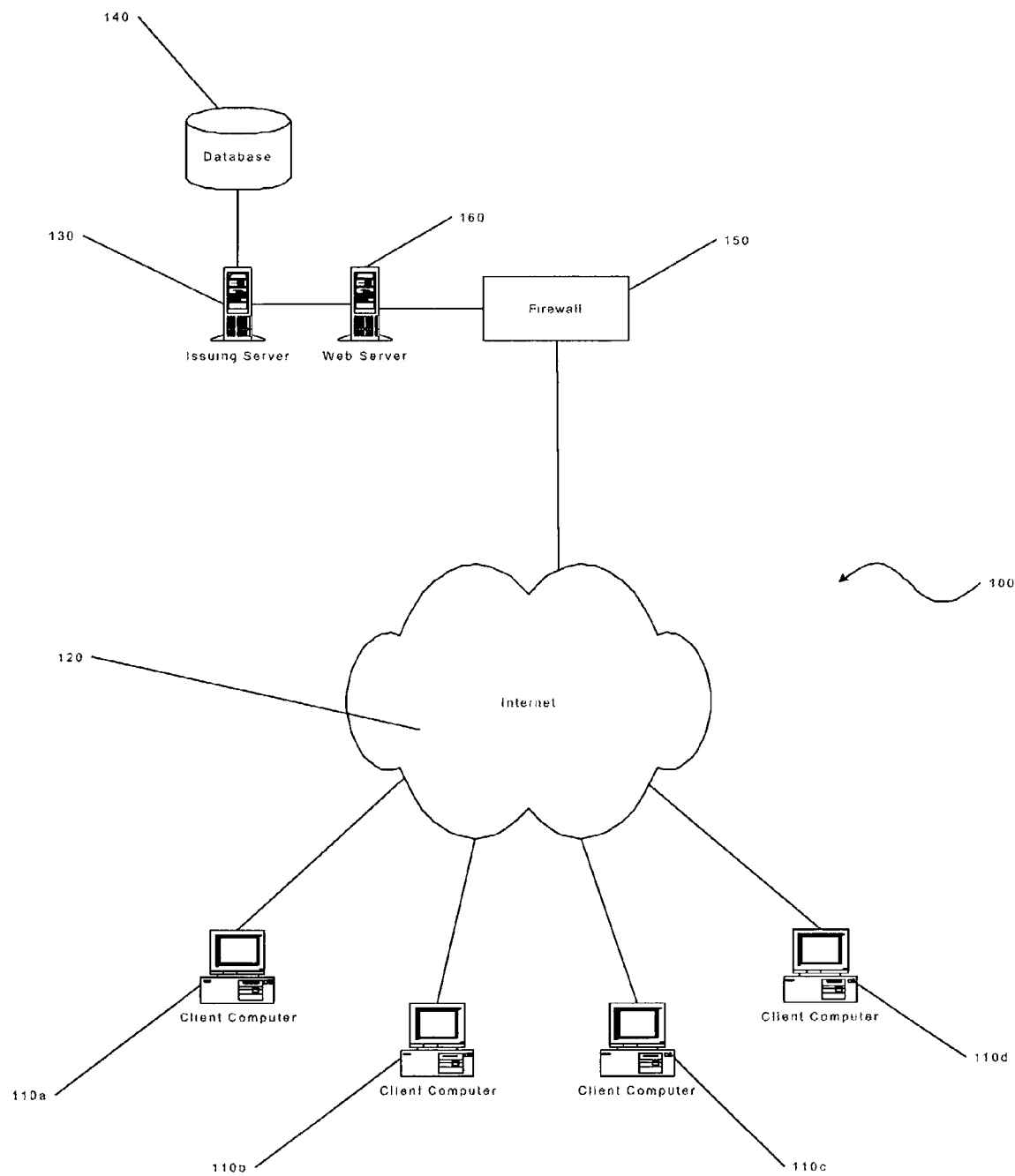
FIG. 1 is a diagram depicting a system for issuing electronic vouchers in accordance with an exemplary embodiment of the present invention.

FIG. 1 is a diagram depicting a system for issuing eVouchers in accordance with an exemplary embodiment of the present invention. Users may access the eVoucher system 100 by way of client computers 110*a-d*, each of which is preferably loaded with a conventional Web browser such as Microsoft Internet Explorer™. Each of the client computers 110*a-d* is connected to an issuing server 130, which is programmed to issue eVouchers as described in greater detail below, and a Web server 160 by way of a conventional data network 120 such as the Internet. Although in this exemplary embodiment the client computers 110*a-d* are preferably personal computers running Web browsers, in alternative embodiments a client computer 110*a-d* may be any device that can be connected to the Internet, including Personal Digital Assistants (PDAs), cellular telephones, interactive televisions, and other mobile communication devices.

The Web server 160 preferably runs a web site from which the merchant's eVouchers may be securely issued, in accordance with an exemplary embodiment of the present invention. Web server 160 also preferably runs a web site from which the merchant's products may be securely purchased, such as an e-commerce or Business to Consumer (B2C) web site. The issuing server 130 is programmed to dynamically generate pages to the Web server 160. The Web server 160 transmits these pages to the client computers 110*a-d*. The pages are preferably formatted using Hypertext Markup Language (HTML), Extensible Markup Language (XML), or any other variant capable of being displayed by a conventional Web browser running on the client computers 110*a-d*.

The issuing server 130 and the Web server 160 may reside on separate computers, as depicted in FIG. 1, or may alternatively exist as separate processes running on the same host computer. Although described in terms of an Internet based configuration, it will be appreciated by those skilled in the art that the system 100 of the present invention may operate entirely on a Local Area Network (LAN), a Wide Area Network (WAN), or through dial-up connections from the client computers 110a-d to, for example, the issuing server 130.

The issuing server 130 is preferably connected to a database 140. Database 140 is preferably a relational database, such as Microsoft SQL Server®. The issuing server 130 is programmed to query database 140, and to retrieve data from it as more fully described below.

Figure 2:
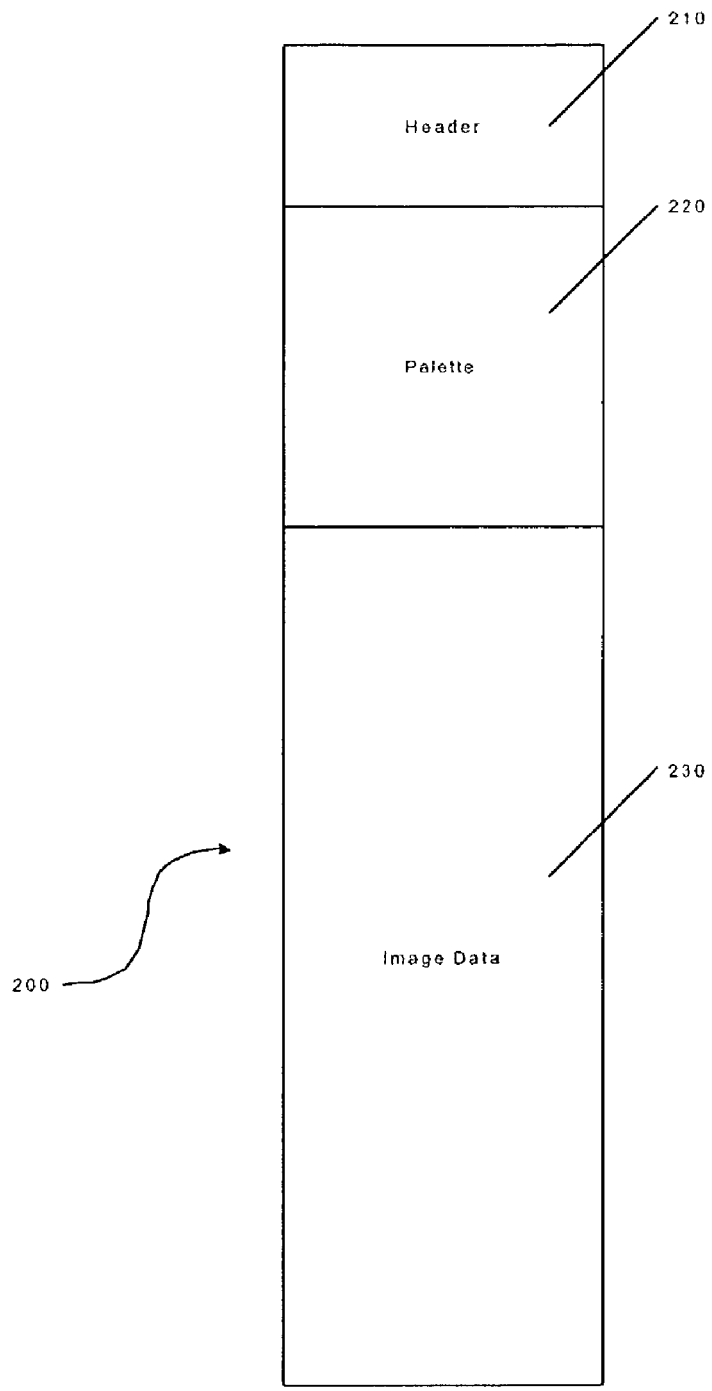
FIG. 2 is a diagram depicting a format for an eVoucher image in accordance with an exemplary embodiment of the present invention.

Before describing the operation of eVoucher system 100, the process by which information may be hidden in an eVoucher image file will be explained. Each eVoucher is an image file 200, the format of which is depicted in FIG. 2 in accordance with an exemplary embodiment of the present invention. The eVoucher image file 200 contains image data that defines an image such as, for example, a corporate logo or any image that identifies the merchant issuing the eVoucher. The eVoucher image file 200 also preferably includes image data that defines an image that depicts the value represented by the eVoucher. Image file 200 is preferably formatted using any standard image file format that employs lossless compression, such as, for example, the Microsoft Windows™ bitmap format (BMP) or the Graphics Interchange Format (GIF).

Generally, an image file indicates a color for each pixel along the horizontal axis or row, and a color for each pixel along the vertical axis or column of a computer graphics display. The eVoucher image file 200 preferably includes three parts: a header 210; a palette 220; and an array of image data 230.

The eVoucher image header 210 contains information describing the size of the eVoucher image, such as, for example, the number of bits allocated per pixel and the bit count. The eVoucher image data 230 is preferably greater than 8 bits per pixel (bpp), and includes data that defines the actual eVoucher image as well as palette index values used to define each pixel's color content. To determine the color of a pixel, the image data and an index into the eVoucher image palette 220 are extracted from the eVoucher image data 230. Although the image data 230 is preferably greater than 8 bpp, it will be appreciated by those of ordinary skill in the art that image data of less than 8 bpp may also be employed.

The color of each pixel in an eVoucher image file is preferably a blend of three color components: red, green and blue. Up to three bytes (one byte per color component) of data may be allocated in an image file to specify a pixel's color. A 24-bit color system (commonly known as a "true color" system), makes full use of all three bytes and is capable of displaying up to 16,777,216 colors. However, most color graphics display systems are 8-bit color systems, and display up to 256 colors.

Figure 3:
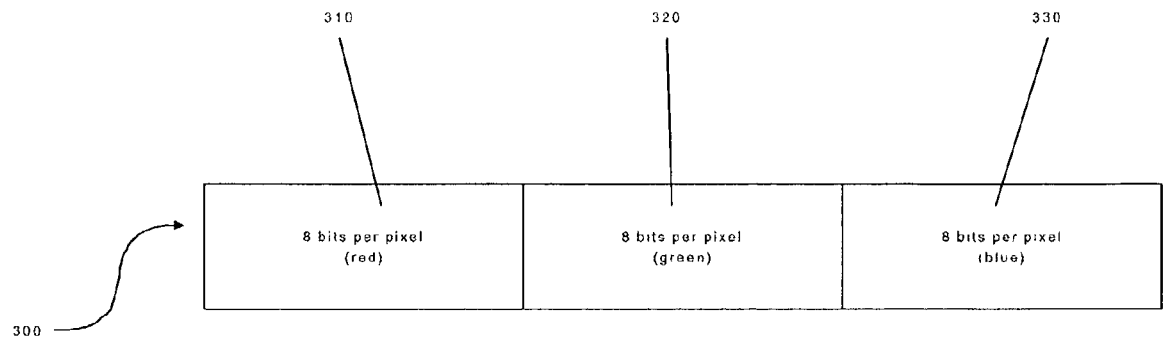
FIG. 3 is a diagram depicting a 24-bit eVoucher image pixel in accordance with an exemplary embodiment of the present invention.

Reducing the number of bits per pixel of image data 230 used to define an eVoucher image 200 results in a fewer number of colors available for use in rendering the image. But such a reduction will not otherwise affect the rendering of the image. As a result, it is possible to reduce the number of bits per pixel of image data 230 used in an eVoucher image 200 without compromising the quality of the image, and to use the unused to store nonimage data within the image file. As an example, consider the 24-bit eVoucher image pixel depicted in FIG. 3, in accordance with an exemplary embodiment of the present invention. Since each of the pixel's three bytes are being fully utilized to represent red, green and blue respectively, the eVoucher image 300 is capable of displaying up to 16,777,216 colors.

Figure 4:
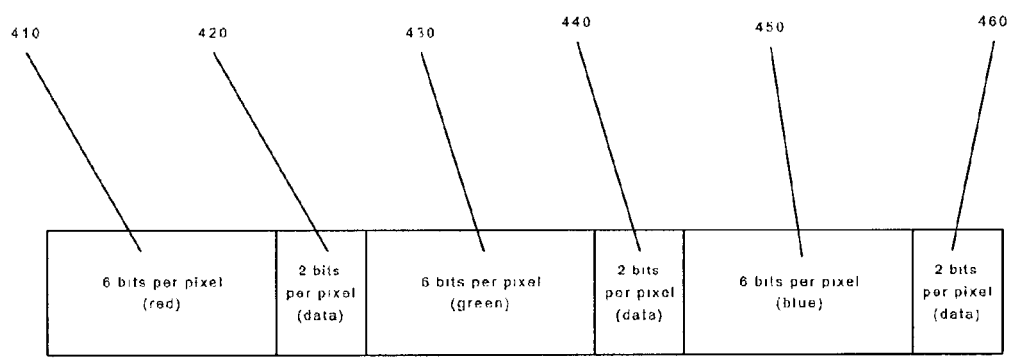
FIG. 4 is a diagram depicting an eVoucher image pixel with embedded nonimage data in accordance with an exemplary embodiment of the present invention.

As depicted in FIG. 4, however, by emptying the two least significant bits in each byte of the 24 bpp image data 300, up to 6 bits of nonimage data may be stored, per pixel. Although the eVoucher image color resolution is reduced from 24 bpp to 18 bpp (i.e., from 16,777,216 colors to approximately 65,536 colors) this will have a negligible effect, if any, on the quality of the eVoucher image. Most graphics systems are only capable of displaying 256 colors.

Nonimage data may alternatively be stored in the eVoucher image data by expanding its original number of bits per pixel to an arbitrary number of additional bits per pixel. Since the added bits are irrelevant in determining pixel color, nonimage data hidden in those bits will have no effect on how the eVoucher image is rendered and displayed.

The operation of the eVoucher system in accordance with an exemplary embodiment of the present invention will now be described with reference to FIGS. 1 and 5. The process begins at step 510, when a purchaser, such as an individual person or a company, contacts an issuer to order an eVoucher. The issuer may be the merchant who will be honoring the eVoucher or, alternatively, may be a trusted third-party that is contracted to generate and issue eVouchers on behalf of the merchant.

The issuer preferably has the issuing server 130, as illustrated in FIG. 1. The issuing server 130 is connected to a Web server 160 that runs an eVoucher issuing Web site. The purchaser may thus, via the Web server 160, order an eVoucher over a secure Internet connection between the issuing server 130 and a Web browser running on the purchaser's client computer 110a-d. When ordering the eVoucher, the purchaser is preferably prompted to enter: an e-mail address for the ultimate recipient of the voucher; a message to the recipient; and the desired value of the eVoucher. To purchase the eVoucher, the purchaser may enter, for example, credit card information, although any conventional form of payment may be used. The issuing server may then store the order information entered by the purchaser in database 140.

At step 520, the issuing server 130 generates an eVoucher that includes an eVoucher image file 200. As was stated previously, the eVoucher image file 200 may be an image of a corporate logo or any other image that identifies the honoring merchant. To ensure that each issued eVoucher is only used once, the issuing server 130 assigns a unique serial number to each eVoucher it generates. The serial number may be encrypted, using conventional encryption techniques, and embedded in the nonimage data bits of the eVoucher image file, using the process previously described in connection with FIGS. 2 through 4.

The serial number may be stored in database 140, and an eVoucher account may be established for the recipient, using the serial number as a unique identifier for the account. Thus, the eVoucher system of the present invention may keep a record, not only of whether the eVoucher has been used, but how much value remains on the eVoucher each time it is used by the recipient.

Preferably, once the eVoucher has been used, the serial number assigned to that eVoucher is never be used again. The process for assigning these unique serial numbers may be carried out by using a conventional Globally Unique Identifiers (GUIDS) algorithm, as those of ordinary skill in the art will readily appreciate. Alternatively, the serial number generation scheme may be accomplished using a simple linear count, in which each eVoucher's serial number is one increment higher than the serial number of the last issued eVoucher.

Since more than one person may have access to the recipient's email address, the eVoucher system of the present invention includes a security mechanism to ensure that only the recipient, and no other entity, is able to redeem the eVoucher.

This security mechanism is based on conventional public key encryption, which is fully described in U.S. Pat. No. 4,405,829, and is well-known to those of ordinary skill in the art. Although the security mechanism is described in terms of the recipient being someone other than the purchaser of the eVoucher, in alternative embodiments the purchaser and the recipient may be the same. In this embodiment, the recipient's identity need not be included in the eVoucher. Thus, for example, a purchaser might buy an eVoucher and have it delivered to himself as the recipient. The purchaser would then be free to redeem the eVoucher himself, or send the eVoucher to yet another person, for example, as a gift.

To implement the security mechanism, at step 530, the issuer sends the recipient an email containing an executable program and the issuer's public key. The executable program is preferably a Java applet which, as will be appreciated by those of ordinary skill in the art, runs in its own secure memory space, and does not require that the software be installed on the recipient's client computer 110*a-d*. Alternatively, however, any executable software program may be utilized.

The Java applet then prompts the recipient to enter some arbitrary text. The text is preferably some piece of information that the recipient will easily remember, such as the recipient's mother's maiden name, and may be used to verify the identity of the recipient. In an alternative embodiment, the purchaser and the recipient may be the same and the recipient may wish to send the eVoucher to yet another person, for example, as a gift. The purchaser/recipient would also pass the arbitrary text on to the ultimate recipient, for the same purposes described above. The Java applet then, at step 540, encrypts the arbitrary text using the issuer's public key and transmits it back to the issuing server 130.

At step 550, the issuing server 130 signs the encrypted text using the issuer's private key, and stores the encrypted signed text in database 140. The issuing server 130 also, at step 550, embeds the encrypted signed text in the eVoucher image file 200. At step 560, the issuer then encrypts the eVoucher using the issuer's private key, and emails the eVoucher to the recipient. It is important to note that since the text entered by the recipient was encrypted using the issuer's public key, only the issuer (using the private key) can decrypt it. Since only the issuer has the issuer's private key, no one, not even the recipient, should be able to decrypt the text embedded in the eVoucher image in order to alter it. As a result, when the recipient attempts to redeem the eVoucher, the issuer and/or the merchant will be able to compare the encrypted text embedded in the eVoucher image with the encrypted text stored in database 140 to verify that the eVoucher being redeemed is the same eVoucher that was sent to the recipient.

Figure 5:
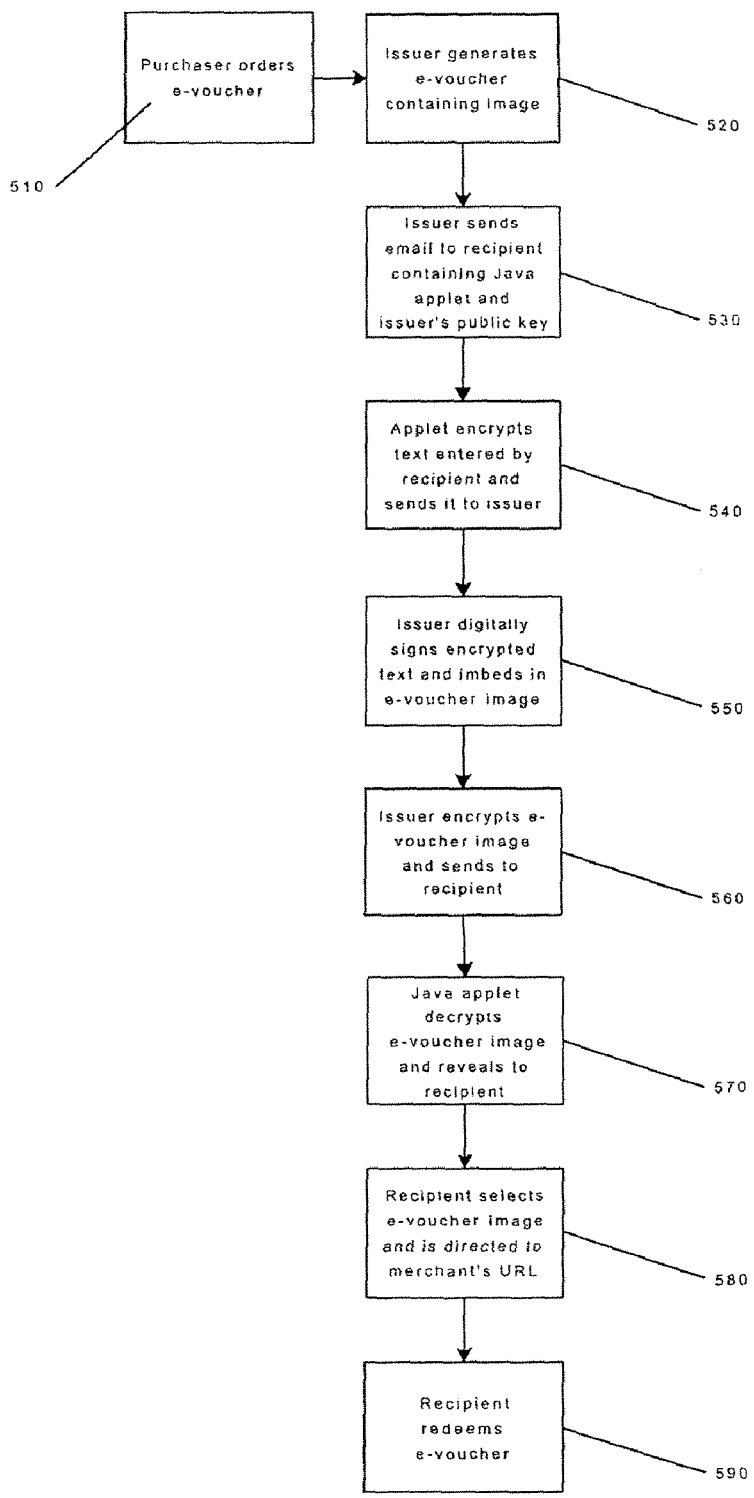
FIG. 5 is a flowchart depicting a method for issuing eVouchers in accordance with an exemplary embodiment of the present invention.

At this point in the process depicted in FIG. 5, the eVoucher and the recipient are deemed trusted by the issuing entity and, as a result, by the merchant as well. To redeem the eVoucher, the recipient preferably, at step 570, opens the email containing the eVoucher sent by the recipient. The Java applet, at step 570, decrypts the eVoucher using the issuer's public key and reveals a valid eVoucher to the recipient. When the recipient clicks at step 580, the eVoucher image, a connection is preferably automatically established to the honoring merchant's e-commerce server, at which the recipient may select a product or service and purchase it using the eVoucher at step 590.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. An electronic voucher embodied on a non-transitory computer readable medium comprising:
   electronic image data defining an image; and
   nonimage data embedded in the image data that uniquely identifies the electronic voucher, wherein altering the nonimage data has no effect on the appearance of the image;
   wherein the image data comprises a plurality of bits that define the image and a plurality of bits that do not define the image, and wherein the plurality of bits that do not define the image comprise the nonimage data; and
   wherein the nonimage data, when processed by a computer processor, verifies that the electronic voucher is authentic.

2. The electronic voucher of claim 1, wherein the nonimage data uniquely identifies a recipient.

3. The electronic voucher of claim 1, wherein the nonimage data identifies a value of the electronic voucher.

4. The electronic voucher of claim 1 wherein the nonimage data defines a hyperlink to a Web server.

5. The electronic voucher of claim 1, wherein the image data defines an image that identifies an entity issuing the electronic voucher.

6. The electronic voucher of claim 1, wherein the image data defines an image that identifies a value of the electronic voucher.

7. A distributed computer system for issuing electronic vouchers representing value, the system comprising:
   an issuing server that:
      generates an image file including electronic image data defining an image;
      embeds nonimage data in the image file, wherein altering the nonimage data has no effect on the appearance of the image; and
      transmits the image file including the embedded nonimage data; and
   a database in which a copy of said nonimage data is stored;
      wherein the image data comprises a plurality of bits that define the image and a plurality of bits that do not define the image, and wherein the plurality of bits that do not define the image comprise the nonimage data.

8. The computer system of claim 7, further comprising a client computer that receives the image file transmitted by the issuing server.

9. The computer system of claim 8, the client computer further displaying to a recipient an image defined by the image data included in the image file.

10. The computer system of claim 7 wherein the issuing server encrypts the image file before transmitting the image file.

11. The computer system of claim 9, wherein the issuing server generates an executable computer program that:
   encrypts arbitrary text entered by the recipient and transmits the arbitrary text to the issuing server; and
   decrypts the encrypted image file transmitted by the issuing server.

12. A method for issuing electronic vouchers representing value, comprising:
   generating an image file including electronic image data defining an image;
   embedding nonimage data in said image file, wherein altering the nonimage data has no effect on the appearance of the image;
   storing a copy of the nonimage data; and
   transmitting the image file including the image data and the embedded nonimage data to a recipient;

wherein the image data comprises a plurality of bits that define the image and a plurality of bits that do not define the image, and wherein the plurality of bits that do not define the image comprise the nonimage data.

13. The method of claim 12, further comprising encrypting the embedded nonimage data.

14. The method of claim 12, further comprising encrypting the image file.

15. The method of claim 14, further comprising:
generating an executable computer program that:
encrypts arbitrary text entered by the recipient and transmits the arbitrary text to the issuing server; and
decrypts the encrypted image file transmitted by the issuing server; and
transmitting the executable computer program to the recipient.

16. The method of claim 12, further comprising displaying to the recipient an image defined by the image data included in the image file.

17. The method of claim 16, further comprising connecting the recipient to a Web server upon selection of the displayed image.

18. A method for issuing electronic vouchers representing a value, the method comprising:
providing an image data file comprising electronic image data defining an image, the image comprising a plurality of pixels;
storing the image data file;
embedding nonimage data in a collection of bits present in the image data, each bit in the collection of bits being associated with a pixel in the image, wherein the collection of bits present in the image data is not reflected in an appearance of the image and wherein altering the nonimage data has no effect on the appearance of the image;
storing a copy of the nonimage data; and
transmitting the image file including the image data and the embedded nonimage data to a recipient;
wherein the image data comprises a plurality of bits that define the image and a plurality of bits that do not define the image, and wherein the plurality of bits that do not define the image comprise the nonimage data.

19. The method of claim 18, wherein an appearance of each pixel is completely defined by bits not present in the collection of bits.

20. The method of claim 18, wherein the embedding comprises reducing a number of bits that define an appearance of each pixel.

21. The method of claim 18, wherein the embedding comprises increasing a number of bits associated with each pixel.

22. The method of claim 18, wherein the nonimage data uniquely identifies a recipient.

23. The method of claim 18, wherein the nonimage data identifies a value of the electronic voucher.

24. The method of claim 18, wherein the nonimage data defines a hyperlink to a Web server.

25. The method of claim 18, wherein the nonimage data identifies an entity issuing the electronic voucher.

* * * * *